Patented Mar. 13, 1945

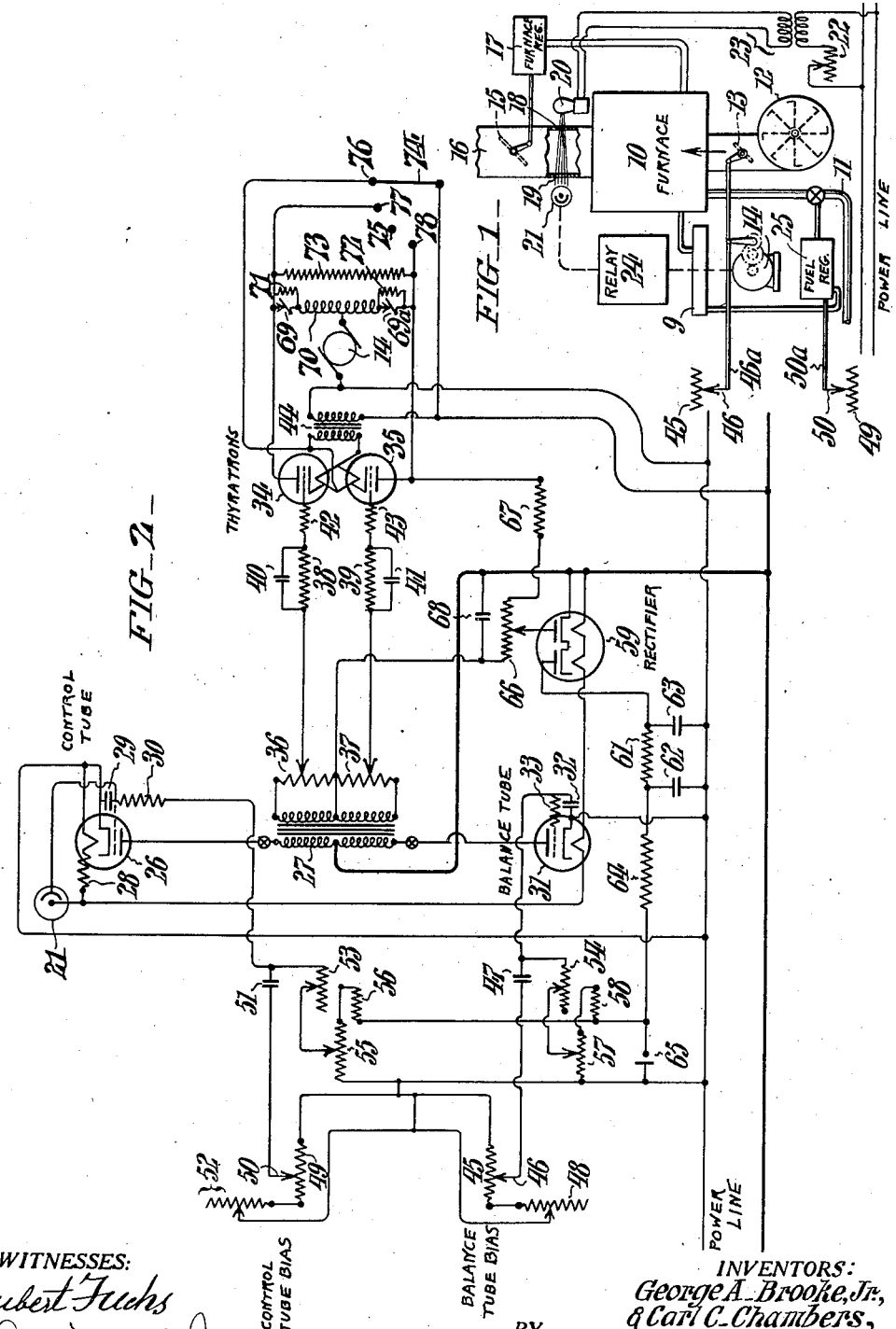

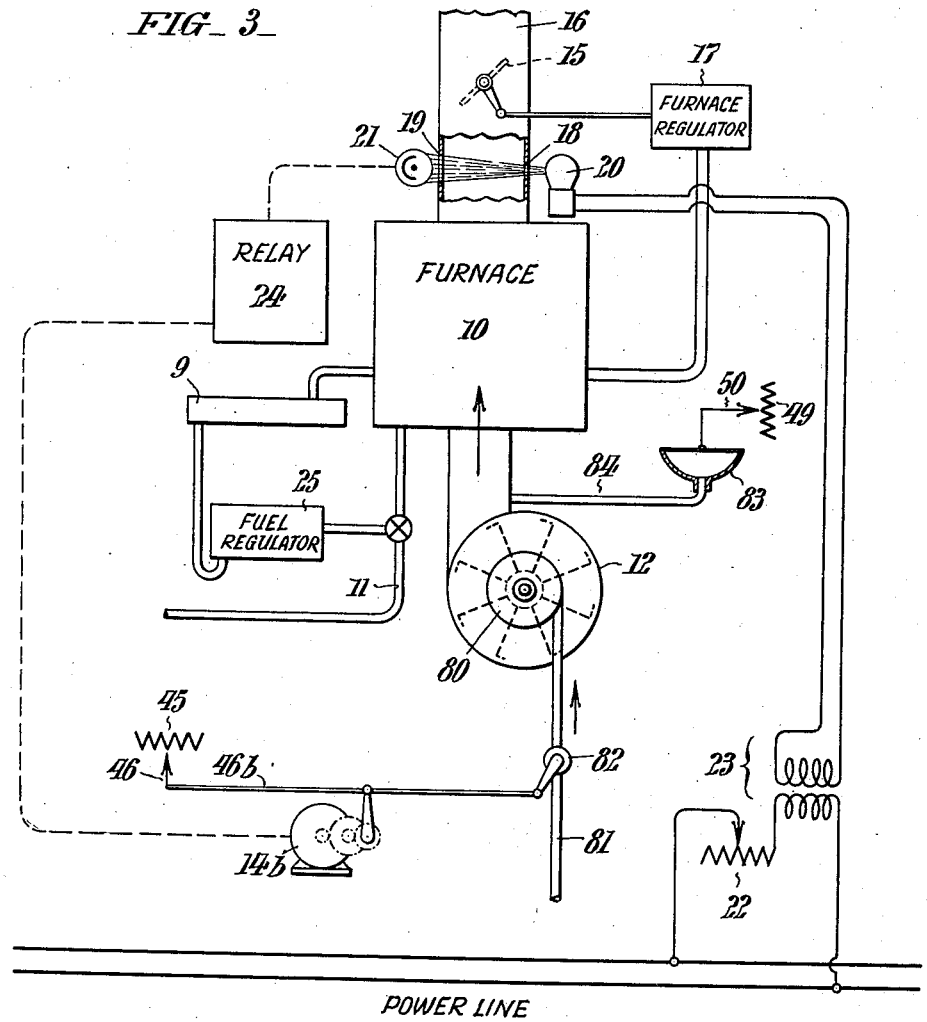

2,371,590

UNITED STATES PATENT OFFICE 2,371,590

CONTROL SYSTEM

George A. Brooke, Jr., Philadelphia, and Carl C. Chambers, Lansdowne, Pa., assignors to Brooke Engineering Company, Inc., Philadelphia, Pa., a corporation of Pennsylvania Application June 6, 1942, Serial No. 446,118

22 Claims. (Cl. 236—15)

This invention relates to an electrical system useful in connection with apparatus wherein one or more governing elements must be moved or shifted for automatic maintenance of a desired or pre-described condition of operation.

Control systems of the kind referred to are particularly advantageous in governing the functioning of steam generating apparatus, and accordingly, for convenience of exemplification, we have herein illustrated and described our invention in a form especially suited to such use; but it will be readily understood by those skilled in the art that, by suitable modifications within the scope of the appended claims, the illustrated embodiment is readily adaptable to other types of apparatus requiring automatic governance, as for example, controls responsive to movements of a galvanometer, a mechanical or electrical meter, or any other sensitive device capable of responding to changes in a condition which it is desired to control.

One of the problems encountered in the regulation of steam generating apparatus by automatic control systems of the kind referred to arises from a tendency toward over-controlling and consequent hunting. This is particularly true where change in the condition of the flue gases is used to initiate an electrical signal impulse which is adapted to bring about a change in the position of the elements regulating the operation of the furnace firing mechanism. In organizations of this nature, a further difficulty 's encountered due to the fact that the density of the flue gases does not always vary directly with changes in the internal condition of the furnace, with resultant tendency toward further over-correction.

Our invention is directed toward overcoming the above mentioned drawbacks. This desideratum we realize in practice, as hereinafter more fully set forth, through provision of a control system which includes a control means capable of responding to the signal voltage or impulse; a means for automatically counterbalancing the signal voltage or impulse so as to modulate the influence of the control means upon a proportional movement of a controlled element; and a resetting means for fully nullifying the effect of the counterbalancing means so as to completely reset the modulating means to normal inactive condition after the cause of the disturbance is overcome or satisfied.

As hereinafter more fully disclosed, an illustrative embodiment of our invention includes an electric eye which responds to a light beam after transmission through the flue gases of the steam generating apparatus to be controlled. The signal impulse from the electric eye is then amplified by a control electron tube and balanced against the output from a balance electron tube. By means of thyratron tubes a reversible motor for actuating the air input to the furnace is then started, its direction and period of operation depending upon the predominance and strength of the signal voltage derived from the control tube and the balance tube. Modulation of the outputs of the control tube and the balance tube is effected by changing the grid bias on these tubes. In the case of the control tube, a modulated (increased or decreased) bias is established upon movement of the fuel regulator of the furnace. In the case of the balance tube, a modulating (increased or decreased) bias is set up by delayed action on a movement of the means which operates the air supply damper of the furnace. The changed bias so set up is stored in a resistance-condenser system and is gradually discharged. When the discharge is complete, the modulating means ceases to function and is thereby automatically fully reset to a normal inactive condition until such time as there is another change in the variable resistance. The extent of bias change is dependent, not upon the position of the movable contacts of the variable resistance in the bias networks, but rather upon the extent of their displacement in response to movements of either the fuel regulator or the air damper motor. The variable bias resistance operated mechanically by the fuel regulator is so arranged that when said fuel regulator moves to supply additional fuel to the furnace, the resulting bias on the control tube is such as to decrease its output. On the other hand, when the fuel regulator moves to decrease the amount of fuel being supplied, the bias is such as to increase the control tube output. Similarly, in the case of the variable resistance actuated mechanically by the air damper motor, when said motor rotates so as to increase the supply of air, the bias impressed upon the balance tube operates to decrease the output of the latter, and when the air damper motor rotates to decrease the supply of air, the output from the balance tube is increased.

Other objects and attendant advantages will appear from the following detailed description of the attached drawings, wherein Fig. 1 is a view more or less diagrammatically represented, of a steam generating apparatus with a control system therefor conveniently embodying our invention.

Fig. 2 is a wiring diagram of the system; and
Fig. 3 is a view like Fig. 1 showing a modification of our invention.

Connected to the furnace 10 of the heating apparatus in Fig. 1 is the usual fuel line 11 which supplies fluent fuel such as oil for heating. Air is introduced into the furnace 10 in the usual way by a blower 12, the input of air being controlled by valve means in the form of a damper 13 the position of which is subject to change in response to movements of an electromagnetic actuator herein represented as a motor 14. A similar valve means or damper 15 is located in the stack 16, its position being determined by the operation of furnace pressure regulator 17. As shown, the stack 16 has aligned diametral openings 18 and 19 which allow the passage of light from an incandescent lamp 20 to a photo-electric cell or "electric eye" 21. Current for the operation of lamp 20 is supplied from an A. C. power line through a voltage regulating transformer 23 (Fig. 1); and adjustments in the intensity of the light are made by means of variable resistance 22. The output of photo-electric cell 21 is amplified by means of control tube 26 (shown in detail in Fig. 2) and utilized to control the action of the motor 14. Fuel regulator 25 operates in response to pressure changes derived from a steam header 9, increased pressure in said header causing the regulator to decrease the amount of fuel being supplied.

Fig. 2 shows the circuit arrangement for the electric eye 21 as well as the circuits involved in relay 24. The output from electric eye 21 is first amplified by means of a control electron tube 26 which may be of the 12J5 type. The amplified output from control tube 26 is then fed to one side of the divided primary coil of a transformer 27. The filament circuit of tube 26 is in series with a 320 ohm resistance 28, and the filament circuits of the balance tube 31 and the rectifier tube 59; and is further provided in its grid circuit with a condenser 29 and a resistance 30 which may be 0.01 mfd. and 3 meg. respectively. It is to be noted that the control and balance tubes 26 and 31 are directly polarized by reason of the connection of the mid point of the primary coil of the transformer 27 to one side of such power line and to the anodes of said tubes, the cathodes of said tubes being connected to the other side of said power line. The balance tube 31, which may also be of the 12J5 type, delivers its output to the other end of the primary coil of transformer 27. As in the case of control tube 26, balance tube 31 is provided with a condenser 32 and a resistance 33 having values of about 0.01 mfd. and 3 megohms respectively. The output from the divided secondary coil of the transformer 27 is fed to the grids of a pair of thyratron tubes 34 and 35. The sensitivity adjustments shown at 36 and 37 are for controlling the operation of the thyratron tubes 34 and 35. The grid circuits of the thyratron tubes 34 and 35 are provided with resistance-condenser networks respectively consisting of resistances 38 and 39 which may be of the order of 0.5 megohm, and condensers 40 and 41 which may have values of 0.05 mfd. Fixed resistances 42 and 43 are also interposed in the grid circuits of the thyratrons, said resistances being of approximately 0.25 megohm. The filaments of tubes 34, 35 are heated by current supplied through a transformer 44 from the power line, and motor 14 will rotate in one direction or the other depending on whether tube 34 or tube 35 fires. The position of the air flow damper 13 is changed in response to movements of the motor 14 in a manner readily understood from Fig. 1.

In the network connected to the grid circuit of balance tube 31, it will be noted that a potentiometer 45 is provided, the movable arm 46 of which is coupled mechanically with the motor 14, conventionally shown at 46a in Fig. 1, for automatic operation thereby. The potentiometer 45 operates in conjunction with a condenser 47 in applying a changed bias voltage to balance tube 31. Movement of the arm 46 of the potentiometer 45 in response to movement of the motor 14 thus produces a modulating action. The range within which modulation will take place is determined by means of an adjustable resistance 48 having a value of 20,000 ohms. A similar potentiometer 49 is provided in the grid circuit of control tube 26, and the movable arm 50 of said potentiometer is coupled mechanically with the fuel regulator 25 as conventionally shown at 50a in Fig. 2. A condenser 51 of about 8 mfd. is interposed between the movable arm 50 of potentiometer 49 and the grid of control tube 26. The adjustable resistance shown at 52 determines the range within which resistance 49 and condenser 51 operate. An adjustable resistance 53 of 3 megohms controls the time required for return to normal of the bias set up by movement of contact 50 along the coil of potentiometer 49 and condenser 51. Similarly, an adjustable resistance 54 controls the time required for return to normal of the bias by movement of contact 46 along the coil of potentiometer 45 and condenser 47. Variable resistance 55 and fixed resistance 56 of approximately 5000 ohms and 50,000 ohms value, respectively, are for adjusting the normal bias of control tube 26. Similarly variable and fixed resistances 57 and 58, which may have the same values as in the case of resistances 55 and 56, are provided for adjusting the bias on balance tube 31. The normal bias E. M. F. for the control and balance tubes 26 and 31 is derived through a rectifier tube 59 of the 50Y6 type in conjunction with a filter circuit made up of resistance 61 and condensers 62 and 63. A fixed resistance 64 and a voltage regulator 65 are also provided. Rectifier tube 59 also supplies the bias E. M. F. for the thyratron tubes 34 and 35 through adjustable and fixed resistances 66 and 67 and condenser 68.

Limit switches 69 and 69a respectively located at opposite ends of the divided field coil 70 of motor 14 protect said motor by de-energizing it when its movement in one direction passes beyond a predetermined point. Fixed resistances shown at 71 and 72 assure feed-back of stray voltages; and a fixed resistance 73 of about 3000 ohms in value, is relied upon for feeding voltage back to the momentarily inoperative side of the thyratron circuit, thus preventing flickering of that thyratron tube which is not in operation.

The switch arrangement shown at 74 allows of various optional operations. When contact is made with point 75 the relay system is rendered inoperative. When contact is made with point 76 the relay system is placed on an automatic basis and will operate in accordance with the signal voltage applied to the thyratron tubes. When contact is made with point 77 the system will operate to increase the air supply, and when contact is made with point 78 the system will operate to decrease the air supply.

The system is designed to reduce the supply of air when the output from control tube 26 predominates sufficiently over the output from balance tube 21. Since the control and balance tubes 26 and 27 are both biased by the same direct current grid voltage and are similar tubes, the current flow through both the upper and lower halves of the primary of the transformer 27 will be identical, and since they are out of phase will give rise to zero voltage normally in the secondary coil of said transformer. However, when tubes 26 and 27 are unbalanced, the net flux in the transformer due to the difference in the currents in the two sections of the primary winding will produce a voltage in the secondary which will differ from the derivative with respect to the time of this flux in accordance with the ratios of the reactance of the secondary to the resistances 36 and 37. This voltage will be in the form of a pulse which depends upon the ratio of the inductance of the secondary of the transformer to the resistances 36 and 37. By choosing the ratio properly, the voltage ratio may be made to appear at the time when the plate voltage of the thyratrons is becoming positive. This form of voltage insures that the thyratrons will be fired at the beginning of their conductive cycles. With this in mind it will be seen that a decrease in the output of control tube 26 (assuming a constant output from balance tube 31) will result in an increased air supply. When motor 14 operates to increase the air supply, the position of the operating arm 46 of potentiometer 45 is changed, condenser 47 is charged proportionally and a bias is set up in the grid circuit of balance tube 31. This results in a relative decrease in the effect of balance tube 31 and a consequent tendency to re-balance the output of the two tubes 26 and 31, preventing further immediate movement of motor 14. However, the condenser charge will leak off through adjustable resistor 54, resistor 57 and 45, and contact 46, the time required for said charge to leak off being adjustable by means of resistor 54.

In the case of a movement of the fuel regulator 25, an increasing mechanical movement of the arm 50 of potentiometer 49 is made. When the movement of fuel regulator 25 has been such as to increase the fuel being supplied, the effect of the bias set up in the grid circuit of control tube 26 is in the direction of decreasing its output, resulting in an increase in the air supply. Increases in the fuel supply are therefore attended by increases in the air supply to the furnace. A change in fuel regulator 25 in the direction of decreased fuel supply, on the other hand, results in a grid bias on control tube 26 which increases its output with resultant decrease in the amount of air being supplied.

It will thus be seen that an increase of fuel will result momentarily at least in an increase in air supply, but this increase will be checked through the mechanical linkage with the motor 14 and potentiometer 45, producing a decreased output in balance tube 31, thereby re-balancing the two tubes 31 and 26, and preventing a continued oversupply of air. Furthermore, bias caused by charge of condenser 51 and that caused by charge of condenser 47 will disappear as these condensers discharge through their respective loop circuits.

By suitable modifications within the scope of certain of the appended claims, the control system of our invention is also applicable, with attainment of advantages comparable to those hereinbefore pointed out, to steam generating apparatus where a steam turbine is used to drive the blower which supplies forced draft air to the furnace. In apparatus of this type it is desirable to regulate the volume of the air supply to the turbine. Such an organization is delineated in Fig. 3, where the air blower 12 is directly connected to the turbine 80 to which steam under pressure is conducted through a pipe 81. As shown a valve 82 interposed in the pipe 81 is arranged for actuation by an electro-magnetic actuating unit 14b (like the unit 14 of Fig. 1), whereto the shiftable point of the potentiometer 45 embodied in the relay 24 is mechanically coupled as conventionally indicated at 46b. The shiftable point 50 of the potentiometer 49, on the other hand, is here mechanically coupled as at 50b with a pressure responsive diaphragm device 83 in communication with the delivery trunk of the blower by way of a pipe 84. By means of our improved control system in Fig. 3, quick response is obtained as a consequence of opening of the valve 82 an excessive amount, and, after the air pressure starts to change when the turbine 80 picks up speed, the diaphragm 83 operates to effect, through its influence in the modulation of the system, return of the valve to the position required for maintaining a new rate of speed of the turbine.

Having thus described our invention, we claim:

1. A control system for apparatus with a normally quiescent governing element subject to operation by an electro-magnetic actuator, said system including means influenced by changes in the behavior of the apparatus for producing an electric signal impulse; a control electron tube for receiving and amplifying said impulse; means influenced by the output of the control tube for supplying current for the operation of the electro-magnetic actuator; a biasing circuit for the tube grid with an interposed potentiometer; a mechanical connection operated from a movable part of the apparatus other than the aforesaid governing element for regulating the potentiometer to modulate the grid bias; and means for automatically fully resetting the biasing circuit to normal inactive condition upon the lapse of a definite time interval after initiation of the biasing circuit.

2. A control system for apparatus with a normally quiescent governing element subject to operation by an electro-magnetic actuator, said system including means influenced by changes in the behavior of the apparatus for producing an electric signal impulse; a control electron tube for receiving and amplifying said impulse; means influenced by the action of the control tube for supplying current for the operation of the electro-magnetic actuator; a biasing circuit for the tube grid with an interposed potentiometer; a mechanical connection operated from a movable part of the apparatus for regulating the potentiometer to modulate the grid bias; and a reset means comprising a resistance-condenser network connected with the grid circuit of the tube, said network having a definite discharge period during which the biasing circuit is automatically fully reset to normal inactive condition after initiation of the biasing circuit.

3. A control system for apparatus with a normally quiescent governing element subject to operation by an electro-magnetic actuator, said system including means influenced by changes in the behavior of the apparatus for producing an electric signal impulse; a control electron tube for receiving and amplifying said impulse; means influenced by the action of the tube for supplying current for the operation of the electro-magnetic actuator; a biasing circuit for the tube grid with an interposed potentiometer; a mechanical connection operated from a movable part of the apparatus other than the magnetic actuator for regulating the potentiometer in the grid circuit to modulate the action of the tube; and a resetting means comprising a resistance-condenser network connected with the grid circuit of the tube, said network having a definite discharge period during which the biasing circuit is automatically fully reset to normal inactive condition after initiation of the biasing circuit, said network being adjustable for variation of the time of its discharge.

4. A control system according to claim 3, in which the electric signal impulse producing means is in the form of a photo-electric cell in circuit with the grid of the control tube.

5. A control system for apparatus with two normally quiescent inter-dependent governing elements, one subject to operation by a reversible electro-magnetic actuator and the other subject to operation by a separate actuator, said system including means influenced by changes in the behavior of the apparatus for producing an electric signal impulse; an electron control tube for amplifying said impulse; another electron tube for balancing the control tube; a pair of thyratron tubes for controlling current supply to the magnetic actuator; means in circuit with the grids of the thyratrons and subject to the predominance in the output of the control tube or the balance tube to determine the direction of movement of the electro-magnetic actuator; variable bias means for the grids of the control and balance tubes; modulating means operated through mechanical connections with the two actuators respectively for regulating the bias means of the balance and control tubes; and coordinated resistance-condenser networks respectively in circuit with the grids of the control and balance tubes, said networks having predetermined discharge periods whereby the bias circuits are automatically fully reset to normal inactive condition after the initiation of the biasing circuits.

6. A control system according to claim 5, in which the resistance-condenser networks are independently adjustable for variation of their respective discharge periods.

7. A control system according to claim 5, in which the resistance-condenser networks are independently adjustable to vary the extent of bias change upon a given movement of the control means.

8. A control system for apparatus having two normally quiescent governing elements, one subject to operation by an electro-magnetic actuator, and the other subject to operation by a separate means, said system including a control electron tube; an opposing balance tube whose output normally balances that of the control tube; means influenced by predominance in the output from one or the other of the two tubes for moving the electro-magnetic actuator in one direction or the other; means influenced by changes in the behavior of the apparatus for producing an electric signal impulse to affect the grid voltage of the control tube; variable bias means respectively for the grids of the control and balance tubes; modulating means mechanically operated upon movement of the electro-magnetic actuator through which the grid bias of the balancing tube is regulated to influence said tube; a modulating means mechanically actuated upon movement of the separate means aforesaid through which the grid bias of the control tube is regulated to influence said tube; and resistance-condenser networks in circuit with the grids of the respective tubes, said networks having definite discharge periods whereby the modulated bias circuits are automatically fully reset to inactive condition upon the expiration of a definite time interval after initiation of the biasing circuits.

9. A combustion control system for steam generating apparatus having a furnace, regulating means for respectively controlling combustion air and fuel supply to the furnace, an electro-magnetic actuator for the air supply regulator and a separate actuating means for the fuel supply regulator, said system including means sensitive to changes in internal conditions of the furnace for producing an electric signal impulse; control means affected by such impulse for operating the actuator for the combustion air regulator; modulating means automatically actuated through connections with the air regulator and fuel regulator actuators for influencing the control means; and means cooperating to automatically fully reset the modulating means to normal inactive condition upon the expiration of a definite time interval after initiation of the modulating means.

10. A combustion control system for steam generating apparatus having a furnace, means for respectively regulating the supply of combustion air and fuel to the furnace, an electro-magnetic actuator for the air regulator means, and a separate actuator for the fuel supply regulator means, said system including a light source for projecting a light beam through the combustion gases passing from the furnace; a photo-electric cell influenced by variations in the intensity of the light beam; a voltage sensitive electric control element responsive to the action of the photo-electric cell for governing the operation of the actuator for the air regulator; modulating means in circuit with said control element and subject to governance mechanically by the actuator for the fuel regulator to influence the control element; and resetting means for automatically fully resetting the modulating means to normal inactive condition upon expiration of a definite time interval after initiation of the modulating means.

11. A combustion control system for steam generating apparatus having a furnace, regulating means for respectively controlling the supply of combustion air and fuel to the furnace, an electro-magnetic actuator for the air regulating means, and a separate actuator for the fuel supply regulating means, said system including a light source for projecting a light beam through the combustion gases passing from the furnace; a photo-electric cell influenced by variations in the intensity of the light beam; a voltage sensitive control element responsive to the photo-electric cell for governing the operation of the air supply regulating means; modulating means in circuit with the control element and subject to mechanical operation respectively by the fuel regulating means for influencing the action of said control element; and resetting means for fully resetting the modulating means to normal inactive condition at the expiration of a definite time interval after initiation of the modulating means.

12. A combustion control system for steam generating apparatus having a furnace, means for respectively regulating the supply of combustion air and fuel to the furnace, an electro-magnetic actuator for the air regulating means, and a separate actuator for the fuel regulating means, said system including means sensitive to changes in conditions within the furnace for producing an electric signal impulse; a control electron tube for amplifying said impulses; an electron tube for balancing the output from the control tube; a pair of thyratron tubes for governing directional operation of the air regulator actuator in accordance with the strength of the impulse derived from the control tube or the balance tube; variable grid biasing means respectively for the control and balance tubes; modulating means automatically operated through mechanical connections with the actuators for the air and fuel regulators for varying the grid biasing means respectively of the balance and control tubes to govern the system; and resetting means for fully restoring said modulating means to normal inactive condition upon a lapse of a predetermined time interval after initiation of the biasing means.

13. A combustion control system for steam generating apparatus having a furnace, means for respectively regulating the supply of combustion air and fuel to the furnace, a reversible electric motor for actuating the air regulating means, and a separate means for actuating the fuel regulating means, said system including means sensitive to changes in conditions within the furnace for producing an electric signal impulse; a control electron tube for amplifying the signal impulse; a balance electron tube for balancing the output of the control tube; a pair of thyratron tubes for governing the direction and the extent of operation of the air valve actuating motor in accordance with predominance of output from the control tube or the balance tube; variable grid biasing means respectively for the control and balance tubes; means automatically operative through mechanical connections respectively with the actuators for the air and fuel regulating means for varying the grid biasing means of the balance and control tubes to modulate their outputs; and resetting means automatically operative to fully reset the biasing means to normal inactive condition upon the lapse of a definite time interval after initiation of the biasing means.

14. A combustion control system for steam generating apparatus having a furnace, means for respectively regulating the supply of combustion air and fuel to the furnace, an electro-magnetic actuator for the air regulating means, and a separate means for actuating the fuel regulating means, said system including means sensitive to changes in conditions within the furnace for producing an electric signal impulse; a control electron tube for amplifying said impulse; a balance electron tube for balancing the control tube; thyratron tubes for governing directional operation of the actuator for the air regulator in accordance with the predominance of the output of the control tube or the balance tube; variable grid biasing means respectively for the control and balance tubes; mechanical connections for respectively actuating the grid biasing means of the balance and control tubes from the actuators for the air and fuel valve actuators to modulate the influence of said tubes; and resetting means for automatically fully resetting the grid biasing means to inactive normal condition upon the expiration of a definite time interval after initiation of the biasing means.

15. A control system for a steam generating apparatus having a furnace; a normally quiescent air supply regulator with an electro-magnetic actuator therefor, and a normally quiescent fuel supply regulator operated through changes in steam pressure, said system including a control electron tube; a balance tube whose output is balanced against the output of the control tube; means influenced by predominance in the output from one or the other of the two tubes for moving the electro-magnetic actuator in one direction or the other; means influenced by changes in the density of the combustion products within the furnace of the generator for producing an electric signal impulse to affect the grid voltage of the control tube; variable bias means respectively for the grids of the control and balance tubes; a mechanical connection through which the grid bias means of the balance tube is modulated to vary the effect of said tube upon movement of the electro-magnetic actuator; a mechanical connection through which the grid bias means of the control tube is regulated upon movement of the fuel degulator of the furnace to modulate the influence of the latter tube; and resetting means comprising resistance-condenser networks in circuit with the grids of the respective tubes, said networks having definite discharge periods whereby the grid biasing means are automatically fully restored to normal inactive condition upon the expiration of a definite time interval after the initiation of the biasing means.

16. A combustion control system for steam generating apparatus embodying a furnace, regulating means for governing the supply of combustion air to the furnace, and an electrically-controlled actuator for the regulating means, said system including means influenced by changes in the behavior of the apparatus for producing an electric signal impulse; a control electron tube for receiving and amplifying such impulse; means influenced by the output of the control tube for supplying current for the operation of the actuator aforesaid; a biasing circuit for the tube grid with an interposed potentiometer; a mechanical connection operated from a movable part of the apparatus other than the aforesaid regulating means for adjusting the potentiometer to modulate the grid bias; and means for automatically fully resetting the biasing circuit to normal inactive condition upon the lapse of a definite time interval after initiation of the biasing circuit.

17. The invention according to claim 16, in which the movable part of the apparatus is in the form of a regulator for governing the supply of fuel to the furnace.

18. A combustion control system for steam generating apparatus embodying a furnace, regulating means for governing supply of combustion air to the furnace, and an electrically-controlled actuator for the regulating means, said system including means sensitive to density changes in the flue gases passing from the furnace for producing an electric signal impulse; a control electron tube for receiving and amplifying such impulse; means influenced by the output of the control tube for supplying current to operate the magnetic actuator aforesaid; a biasing circuit for the tube grid with an interposed potentiometer; a mechanical connection operated from a movable part of the apparatus other than the aforesaid regulating means for adjusting the potentiometer to modulate the grid bias; and means for automatically fully resetting the biasing circuit to normal inactive condition upon the lapse of a definite time interval after initiation of the biasing circuit.

19. A combuston control system for steam generating apparatus embodying a furnace, a turbine-driven blower for injecting air into the furnace, regulating means for governing supply of steam to the turbine, and an electrically-controlled actuator for the regulating means, said system including means sensitive to changes in the internal condition of the furnace for producing an electric signal impulse; a control electron tube for receiving and amplifying such impulse; means influenced by the output of the control tube for supplying current to operate the aforesaid actuator; a biasing circuit for the tube grid with an interposed potentiometer; a mechanical connection operated from a movable part of the apparatus other than the aforesaid regulating means for adjusting the potentiometer to modulate the grid bias; and automatic means for fully resetting the biasing circuit to normal inactive condition upon the lapse of a definite time interval after initiation of the biasing circuit.

20. A combustion control system for steam generating apparatus embodying a furnace, a turbine-driven blower for supplying combustion-supporting air to the furnace, valve means for governing the supply of steam to the turbine, and an electrically-controlled actuator for the valve, said system including means sensitive to changes in the internal condition of the furnace for producing an electric signal impulse; a control electron tube for receiving and amplifying such impulse; a biasing circuit for the tube grid with an interposed potentiometer; means influenced by the output of the control tube for supplying current for operating the actuator for the valve means; means respectively coupled mechanically with the valve actuator and a device sensitive to pressure change in the delivery end of the blower for modulating the grid bias of the tube; and means for automatically fully resetting the biasing circuit to normal inactive condition upon the lapse of a definite time interval after initiation of the biasing circuit.

21. A control system for apparatus with two normally quiescent inter-dependent governing elements, one subject to operation by a reversible electro-magnetic actuator, and the other subject to operation by a separate actuator, said system including means influenced by changes in the behavior of the apparatus for producing an electric signal impulse; an electron tube for amplifying such impulse; another electron tube for balancing the control tube; a transformer with a divided primary coil the mid point of which is connected to a source of alternating current, and to the opposite ends of which the anodes of said control and balance tubes are respectively connected; a pair of thyratron tubes with their grids connected respectively to opposite end sections of a divided secondary coil of the transformer; means in circuit with the grids of the thyratrons and subject to the predominance in the output from the respective sections of the secondary of the transformer to determine the direction of movement of the electro-magntic actuator; variable bias means for the grids of the control and balance tubes; modulating means operated through mechanical connections with the two actuators respectively for regulating the bias means for the balance and control tubes; and coordinated resistance-condenser networks respectively in circuit with the grids of the control and balance tubes, said networks having predetermined discharge periods whereby the bias circuits are automatically fully reset to normal inactive condition after each operation of the system.

22. In an electronic control system for controlling means subject to changes in physical characteristics, a transformer having primary and secondary coils with the mid point of the primary coil connected to the one side of an A. C. power line; a divided resistance connected across the ends of the secondary coil of the transformer; a pair of vacuum tubes arranged in opposed relation and having their anodes connected respectively to the opposite ends of the primary coil of the transformer and with their cathodes connected to the other side of the A. C. power line; means normally applying D. C. biasing voltage in like degree to the grids of the vacuum tubes; means for unbalancing said grids in accordance with the physical characteristic of the means under control; a pair of thyratron tubes, one having its anode connected to the mid point of the secondary coil of the transformer, and the grids of said thyratrons being connected to the respective divisions of the aforesaid resistance; and means energized through said thyratron tubes to effect a correction in the physical characteristic of the means under control.

GEORGE A. BROOKE, JR.
CARL C. CHAMBERS.